United States Patent [19]
Naumann

[11] Patent Number: 5,421,237
[45] Date of Patent: Jun. 6, 1995

[54] ACCELERATION APPARATUS

[75] Inventor: Karl W. Naumann, Weil am Rhein, Germany

[73] Assignee: Deutsch-Französisches Forschungsinstitut Saint Louis, Saint-Louis, France

[21] Appl. No.: 998,259

[22] Filed: Dec. 28, 1992

Related U.S. Application Data

[63] Continuation of Ser. No. 638,610, Jan. 8, 1991, abandoned.

[30] Foreign Application Priority Data

Jan. 29, 1990 [DE] Germany ............... 40 02 529.2

[51] Int. Cl.⁶ ............... F41A 1/04; F41A 21/46
[52] U.S. Cl. ............... 89/8; 89/14.6; 89/7; 244/63
[58] Field of Search ............... 89/7, 8, 14.6; 244/63

[56] References Cited

U.S. PATENT DOCUMENTS

| | | | |
|---|---|---|---|
| 2,383,559 | 8/1945 | Parker | 244/63 |
| 2,953,065 | 9/1960 | Brown | 89/8 |
| 3,427,648 | 2/1969 | Manning et al. | 89/14.6 |
| 3,788,188 | 1/1974 | Donner | 42/78 |
| 4,534,265 | 8/1985 | Bates et al. | 89/14.6 |
| 4,982,647 | 1/1991 | Hertzberg et al. | 89/8 |

FOREIGN PATENT DOCUMENTS

| | | | |
|---|---|---|---|
| 3808655A1 | 9/1989 | Germany . | |
| 124779 | 4/1919 | United Kingdom | 89/14.6 |

OTHER PUBLICATIONS

*RAM-Beschleuniger*, by G. Smeets, ISL N 601/88.
*The Ram Accelerator...*, by A. Hertzberg et al., Aerospace and Energetics Research Program, Sep. 12, 1986.
Tyler et al, "'Gun Barrel' Launching", Space/Aeronautics, Feb. 1959, pp. 52–54.

*Primary Examiner*—Stephen E. Bentley
*Attorney, Agent, or Firm*—Armstrong, Westerman, Hattori, McLeland & Naughton

[57] ABSTRACT

The invention relates to an acceleration apparatus comprising an accelerator surrounding an acceleration path with the exception of at least its mouth-side end and an acceleration body which is configured for guided and accelerated motion along the acceleration path and is formed by a missile and preferably a propelling housing at least partially surrounding said missile and in engagement therewith.

According to the invention, in the accelerator at least two rectilinear guide rails or guide grooves are formed which preferably have a mutual identical angular distance with respect to the bore axis and which are adapted to be brought into constrained engagement with the acceleration body directly and/or indirectly via at least one respective slide shoe on the acceleration body. Furthermore, in the region of the mouth-side end a release means is disposed which is configured for constrained detachment and release of the missile from all other parts of the acceleration body by the movement thereof transversely of the acceleration direction.

Preferably, the missile is configured as model for measurements outside the accelerator.

2 Claims, 3 Drawing Sheets

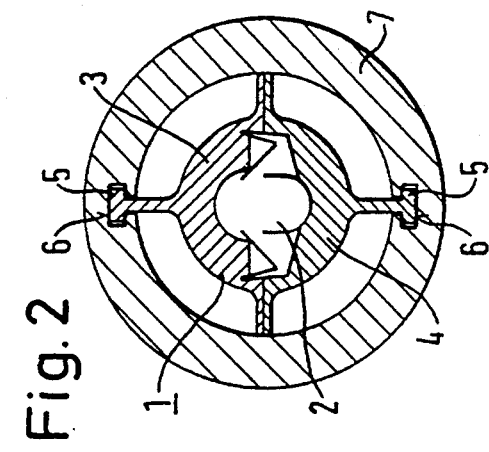
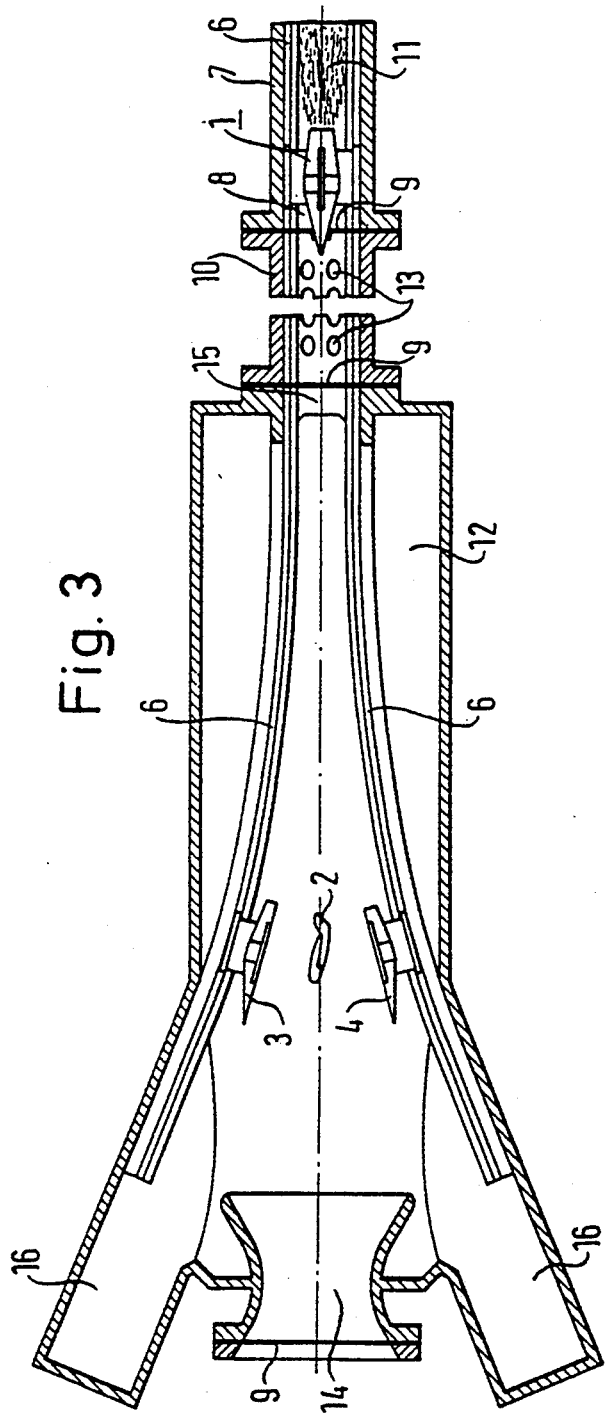
Fig. 2
Fig. 1
Fig. 3

ACCELERATION APPARATUS

This application is a continuation of application Ser. No. 07/638,610 filed Jan. 8, 1991, now abandoned.

BACKGROUND OF THE INVENTION

1. Field of the Invention

The invention relates to an acceleration apparatus comprising an accelerator surrounding an acceleration path with the exception of at least the mouth-side end thereof and an acceleration body which is configured for guided and accelerated motion along the acceleration path and is formed by a missile and preferably a propelling housing at least partially surrounding said missile and in engagement therewith.

2. Description of the Prior Art

Acceleration apparatuses of this type comprise an acceleration path within a usually tubular accelerator and an acceleration body is subjected to an acceleration along said path.

Said acceleration body may directly represent the missile to be accelerated but as a rule forms a propelling housing which surrounds the missile during the entire acceleration.

One accelerator of this known type is formed for instance by a powder gun with a smooth barrel configured for shooting an under-caliber projectile with cartridge-case base.

After the acceleration in the barrel due to the pressure action of the burning powder on the concrete-case base, the parts thereof detach from the actual missile after leaving the barrel muzzle.

This missile may be for example firstly a projectile designed to attack a target or alternatively for example form a flight model which is accelerated in order to be projected with high velocity through the surrounding air; after leaving the mouth observations can be made on the aerodynamic behaviour occurring.

Now, the detaching of the case base or case jacket parts takes place along a certain flight path of the missile in a relatively irregular manner, the parts detached from the missile moving initially substantially along the flight path thereof.

By irregular detaching of the jacket parts the flight path of the missile can be impaired. Furthermore, the degrees of freedom on designing the propelling jacket are restricted because the parts thereof must all detach themselves from the missile simultaneously.

The impairment of the missile by the parasitic aerodynamic forces here is the greater the smaller the density of said missile. Whereas missiles constructed as balanced rods can as a rule settle again after a disturbance, this is possibly not the case with aerodynamic models, missiles of composite fiber material and missiles with cavities.

If a somewhat uniform detachment operation is assumed then this known arrangement suffices fully for instance for a tank gun. If however measurements are to be made on a missile constructed as model, it must also be ensured that jacket parts do not conceal the surface of the missile, cause air streams disturbing the measurements or even strike the measuring devices. These problems can admittedly be handled but they do involve difficulties.

When such an arrangement is used in an aircraft there is also a danger of damage by the parts of the propelling housing flying about in uncontrolled manner.

When using a so-called ram accelerator a missile is fired into a pipe filled with combustible gas.. Between the pipe wall and the missile or projectile said gas is compacted and ignited and it therefore then burns behind the missile, gently but continuously accelerating said missile like a ram jet engine.

Such a ram accelerator is described in German OS 3,808,655.

The mode of operation of such a ram accelerator sets very narrow limits on the outer form of the projectile to be accelerated. Now, if a missile or projectile differs in its shape from the shape required for a ram accelerator from the aerodynamic point of view, then said missile must be surrounded by a suitably shaped propelling housing which after the acceleration has been produced must be removed as rapidly and as interference free as possible from the missile.

Furthermore, hitherto it was also not possible to use such a ram accelerator for after-acceleration of a missile freed from its cartridge-case base because the flight path necessary for reliable detachment of the propelling base parts is too long and because the base parts striking the ram accelerator endanger the operating team.

Another problem involved in the acceleration of models and instrument carriers is that to achieve a necessary final velocity disproportionalPly high acceleration values must be accepted and they are capable of damaging the missile, particularly since in the case of a powder or light-gas gun the acceleration takes place irregularly.

Finally, a problem common to all accelerators is that the exact rotational position with respect to the flight path axis cannot be exactly fixed and therefore there is a possibility of the fired model assuming a flight attitude unsuitable for the measurement to be made.

SUMMARY OF THE INVENTION

The invention is therefore based on the problem of providing an acceleration apparatus which at least partially eliminates these disadvantages and in particular can be employed for accelerating models and instrument carriers, ensuring a gentle acceleration, and in which the measurement on the free-flying missile and the measuring means for that purpose are not endangered by propelling case parts flying around.

The invention therefore proposes in an acceleration apparatus comprising an accelerator surrounding an acceleration path with the exception of at least the mouth-side end thereof and an acceleration body which is configured for guided and accelerated motion along the acceleration path and is formed by a missile and preferably a propelling housing at least partially surrounding said missile and in engagement therewith, the improvement in which in the accelerator at least two straight guide rails or guide grooves are formed which preferably have an equal mutual angular spacing with respect to the bore axis and which are adapted to be brought into constrained engagement with the acceleration body directly and/or indirectly via at least one respective slide shoe in the acceleration body, and in the region of the mouth-side end a release means is disposed which is configured for constrained detachment and release of the missile from all other parts of the acceleration body by the movement thereof transversely of the acceleration direction.

In accordance with the invention, in the accelerator rectilinear longitudinal guides are formed which are in constrained engagement with the propelling housing or directly with the missile; these longitudinal guides ensure that the acceleration body has an exactly defined attitude both within the accelerator and after leaving the accelerator.

Since the rectilinear guide rails are arranged preferably at the same mutual angular spacing or distance with respect to the bore axis, they guide the acceleration body in a completely uniformly rectilinear manner so that the missile after leaving the accelerator moves in an exactly reproduceable manner; unintentional rotational or tumbling movements can be reliably avoided in this manner.

It may possibly also be advantageous to arrange the guide rails with unequal mutual spacing.

When the acceleration body has passed the acceleration path it moves into a release means which intervenes in the slide shoes establishing the constrained engagement with the acceleration body and forces said shoes away from the missile together with the parts of the propelling housing to be detached, i.e. with a motion component radially of the bore axis.

The movement of the parts of the propelling housing takes place at an exactly defined point and in an exactly defined direction at the end of the movement path so that the missile in free flight after leaving the accelerator is no longer impaired to a greater or lesser extent in its motion by the parts of the propelling housing, as was the case hitherto.

A substantial advantage also resides in that the parts of the propelling housing detached from the missile body leave the overall arrangement at exactly the same respective points, in substantially the same direction in each case and each at an angle to the bore axis and immediately at the end of the acceleration path. The magnitude of the angle depends on the velocity and strength of the parts of the propelling housing and when considered absolutely may be quite small: with a release velocity of 5000 m/s for example a flight distance of about 40 m is required for the parts of the propelling housing to move 20 cm to the side without them disintegrating under the transverse acceleration to which they are subjected. However, in this case as well the lateral deflection and thus the angle is as large as it possibly can be.

It is also possible to arrange in the flight direction in front of the acceleration path further means for further acceleration of the missile or projectile or for making observations and measurements on the missile; for instance, it is possible to free a missile accelerated in a ram accelerator from its propelling housing in such a manner that the latter does not exert any reactions on the missile itself. It is also possible to further accelerate in a ram accelerator a cartridge-case base projectile after it has left the powder gun accelerating it and after separation of the case base parts. It is further also possible by suitable arrangement of the longitudinal guides in the accelerator and by corresponding design of the release means to guide the ejected propelling house parts so that they do not strike any measuring devices, parts of the aircraft carrying the gun or crew.

Acceleration bodies which have only a missile and no propelling house can also be guided with greater accuracy than was hitherto possible by the action of the slide shoes engaging in the longitudinal guides, and the release of the missile in the release means prevents disturbances of the attitude of the missile caused for instance by defects at the mouth.

Slide shoes means guide elements which bear displaceably against at least a respective minimum number of the guide surfaces of the guide rails or grooves and are connected to the missile directly or indirectly via the propelling housing. In the limit case, the slide shoes can also form elements fixedly connected to the missile.

As explained, the acceleration apparatus according to the invention is admirably suitable for a great variety of uses; according to preferred embodiments of the invention however the missile or projectile is constructed as model for the flow of the ambient air flowing very rapidly relatively thereto or as instrument carrier which is constructed substantially in the form of a projectile to be investigated and permits for example the determination of the temperature distribution, the motions of the longitudinal axis and many other measurements, since due to the highly accurate and undisturbed reproduceability of the flight attitude particularly exact measurements free from interfering marginal conditions are possible, especially since there is no danger of the propelling housing parts striking and damaging the measuring devices.

The acceleration apparatus according to the invention can be used to conduct a series of measurements as in a wind tunnel; however, with only a very small overall technical expenditure an air attack flow onto the model several times the speed of sound can be achieved.

Furthermore, at very high velocities (above 2 km/s) and with long measuring times (several tenths of a second) it is more favourable from the energy point of view to accelerate a few kilograms of model rather than a great number of kilograms of air as in a wind tunnel.

As already indicated above, the release means may have ejection openings out of which the parts of the propelling housing separated from the missile are ejected in predetermined direction.

To avoid jeopardizing of personnel and apparatus in the region of the release means in even better manner and to permit a still more expansive undisturbed use of the surroundings of the acceleration apparatus, according to a further embodiment of the invention a catch means is provided for the separated parts of the acceleration body. The acceleration body thus designed is also suitable for use in a closed laboratory.

On appropriate configuration of the catch means repeated use of the parts of the propelling housing is also possible so that the expenditure for lengthy test series can be considerably reduced.

Preferably, the catch means comprises a relatively short interception well which is closed at its end and which extends from every ejection point of the release means in the direction of movement of the ejected propelling housing parts and out of which the propelling housing parts can be removed after acceleration operation or after a small number of acceleration operations; the catch means may have instead of each interception well an ejection well which deflects the propelling housing parts into a harmless direction and ejects them, for example from the bottom of the aircraft.

The release means may consist of a mouth-side widening of the accelerator, in the wall of which passages are formed for deflecting the propellant gas used for the acceleration in such a manner that said propellant gas initiates and promotes the detachment of the propelling housing parts.

According to a further preferred embodiment of the invention however the release means is formed by an end portion of guide grooves or guide rails in which the distance thereof from the core axis progressively increases in the acceleration direction. In this case, the slide shoes in association with the guide rails or guide grooves are preferably formed at least in the region of the release means such that the slide shoes when the acceleration body moves are moved in constrained manner outwardly away from the bore axis. However, the slide shoes are secured in tension-resistant manner to the propelling housing parts to be detached so that on the outward movement of the slide shoes said parts are also entrained outwardly.

It would however also be possible, and perhaps advantageous, to use the gases driving the acceleration body and acting on the bottom thereof for forcing the parts of the propelling body outwardly so that in this case the construction of guide and slide shoes necessary for transmitting the tensile force outwardly could be dispensed with.

Fundamentally, to avoid influencing the missile in nonuniform manner the release means and the slide shoes can be so constructed and arranged that as far as possible identically formed propelling housing jacket parts are moved outwardly as simultaneously as possible.

In many cases however, particularly when the propelling jacket encloses a model of complicated shape having a cross-section which is not polysymmetric, it is of advantage in accordance with a further preferred development of the invention to construct the release means so that the removal of the propelling housing parts takes place in a predetermined order. With a release means having an increasing axial spacing of the guides the latter may be made asymmetrically with respect to each other; for instance, the distance of one of the guides from the bore axis may start to increase at a point before the other; instead of such a configuration or in addition thereto it is also possible and perhaps advantageous to offset the slide shoes of different jacket parts with respect to each other in the acceleration direction. Thus, it would for instance be possible with the same symmetrically constructed release means to obtain selectively the mutually time staggered outward movement or simultaneous outward movement of the jacket parts, depending on whether or not the slide shoes are offset with respect to each other.

The constrained detachment of the propelling housing parts in a fixed sequence makes it possible in the case of models or instrument carriers to be accelerated to suitably support those sections which would not withstand the acceleration unsupported.

However, such models and instrument carriers may be fundamentally unable, in their flight attitude which they must have when leaving the acceleration apparatus, to withstand the acceleration without damage. It is likewise possible that in their desired flight attitude the models or instrument carriers will not fit into the pipe or barrel cross-section of the accelerator.

In this case, a preferred embodiment of the invention resides in choosing the attitude of the model or instrument carrier in such a manner that it is particularly favourable, for instance enables the model or the instrument carrier to withstand the maximum acceleration occurring in the acceleration operation, and then bringing said model or instrument carrier into the flight attitude prior to termination of the acceleration path, after leaving the release means or preferably in the release means. Thus, it is also possible to accelerate models and instrument carriers having a dimension transversely of the intended flight direction which exceeds the diameter of the accelerator pipe.

For this reason, according to a respective preferred embodiment of the invention a means for aligning the missile is provided before or after the release means, or the release means itself is so configured that it can perform this function.

In this case, for example with staggered removal of the propelling housing parts the first part to be pulled off can be connected to the missile in such a manner that during the removal it is entrained and pivoted into the flight attitude, then strikes another propelling housing part and there comes to a standstill so that the missile is disposed in its stable attitude when the other propelling housing parts are removed.

It is however also possible to provide near the end of the acceleration path a stationary cam projecting into said path, against which a configuration on the propelling housing strikes which in turn causes the missile to move into its flight attitude.

As already remarked above, the accelerator can be constructed as barrel of a powder or light-gas gun which except for the mouth or muzzle is closed all round during the firing.

However, the accelerator can also be constructed as recoil-free pipe, the end of which remote from the mouth is at least partially open during the firing.

It is however also possible to accelerate the acceleration body by a rocket engine; in this case, a particularly low acceleration value can be set as appears appropriate for particularly sensitive models or instrument carriers.

Admittedly, the acceleration path to achieve the same final velocity as with the barrel of a powder gun is then longer; however, it is not necessary to construct the accelerator as pressure-resistant tube; it may also have the form of a tube with grating walls.

It is however particularly advantageous according to a further alternative embodiment to construct the accelerator as ram accelerator. Such a ram accelerator is described in detail in the following publications:

A. Herzberg, A. P. Bruckner, D. W. Bogdanoff, "The Ram Accelerator", 37th ARA Meeting, Quebec, Canada 1986 and G. Smeets, "Ram accelerator and its possibilities in achieving very high projectile velocities", ISL N 601/88, 1988.

Such a ram accelerator is as is known constructed as a tube which is open at either end and which is filled with a combustible gas or gas mixture and to prevent the escape thereof is sealed on both sides by a strong diaphragm.

To increase the acceleration power the gas may have an excess pressure. The acceleration increases in proportion to the filling pressure, the peak pressure occurring in the combustion increasing however at the same time. Suitable excess pressures may be between about 10 bar and 50 bar. Lower and higher excess pressures are conceivable and possibly advantageous.

The tube or pipe is provided with the aforementioned guides.

As a rule, the acceleration body forms towards the tube wall a peripheral gap in which the gas can flow round the acceleration body, the gas burning completely only behind the acceleration body. The acceleration body has a generally conical nose and a conical possibly cut-off tail. The ignition of the gas is spontaneous but at the earliest at the thickest point of the acceleration body.

It is possibly however also advantageous in accordance with a further embodiment of the invention to make the acceleration body of caliber size and in the pipe provide a plurality of grooves which are adapted in number and cross-sectional magnitude to ensure that the initially burning propellant gas flows round the acceleration body.

With such a ram accelerator, it is possible, at least theoretically, to reach a velocity of up to 10 km/s, the maximum acceleration however always being relatively small. Moreover, a particular advantage of the invention resides in that the acceleration which can be achieved is freely selectable in wide limits.

Such a ram accelerator is therefore quite particularly suitable for acceleration of a test object such as a model or an instrument carrier.

The maximum acceleration and exit velocity which can be achieved are governed by the nature and initial pressure of the gas or gas mixture in the pipe.

Since with the very high velocity achievable in the ram accelerator air wave effects can be propagated laterally of the acceleration direction, originating from the propelling housing parts and possibly disturbing the missile, there is a danger of aerodynamic disturbance of the liberated missile by the propelling housing parts.

To eliminate this danger, according to a further preferred embodiment of the invention in front of the mouth of the accelerator a vacuum chamber is disposed which comprises a passage which extends in the acceleration direction and is sealed on boths sides by a diaphragm and into which the acceleration body enters and which the missile leaves.

In the vacuum chamber the release means and preferably also the catch means are disposed. If the latter has ejection wells, the respective well opening thereof is closed by a diaphragm; however, preferably closed interception wells are provided, the volume of which increases that of the vacuum chamber and thus increases the efficacy thereof.

The vacuum chamber also prevents firing gases which can impair the flight attitude and interfere with measuring devices from following the liberated missile on departure thereof.

According to a further embodiment of the invention, between the end of the acceleration path and the release means a propellant gas outlet is formed which may for instance be constituted by an annular gap.

After the acceleration body has passed this propellant gas outlet the following propellant gas can expand so that it reaches the release means only in a very reduced amount and causes there at the most only a slight interference of the release operation and the attitude of the missile.

According to a further preferred embodiment, in a ram accelerator having a preferably following vacuum chamber between said elements a pipe section extending in the acceleration direction is formed which with its two ends adjoins one of the closure diaphragms of the ram accelerator and the vacuum chamber.

Like the accelerator itself, this tube section comprises guide rails or guide grooves which are flush and contiguous on the one hand with those of the accelerator and on the other hand with those of the release means so that the guiding of the acceleration body continues without interruption in the pipe section as well.

The wall of said pipe section is perforated or slit, a plurality of perforations or slits preferably extending in the longitudinal direction so that in dependence upon the length of the tube section a propellant gas outlet is created having a cross-sectional area of considerable magnitude so that a very appreciable gas relief has occurred at the tail of the acceleration body when the latter penetrates the diaphragm at the inlet of the vacuum chamber. The residual pressure of the propellant gas at the bottom of the acceleration body is completely compensated by the reduced pressure in the vacuum chamber so that the acceleration body can be freed from the propelling housing in the release means practically without interference by surrounding gases and consequently the high accuracy of the flight attitude necessary for precision measurements and the required elimination of disturbance along a measuring path are ensured already directly before the acceleration means.

"Slide shoes" refers above to all those elements which are adapted to be brought into guiding engagement with longitudinal guides in the accelerator and which promote the detachment of the propelling gas parts in the release means.

As explained above, the release means is disposed at the front end of the accelerator; however, after the release an after-acceleration of the missile may possibly occur so that it might even be advantageous to arrange the release means constructionally in front of the end of the accelerator and incorporate said means into the latter.

The invention relates expressly not only to an apparatus for particularly troublefree and precise acceleration of an acceleration body, especially for measurements on a highspeed missile, but also expressly to a method of carrying out such an acceleration and initiating such measurements.

BRIEF DESCRIPTION OF THE DRAWINGS

The invention will be explained hereinafter in detail with the aid of examples of embodiment with reference to the attached schematic drawings, wherein:

FIG. 1 is a longitudinal section through part of a ram accelerator and the acceleration body disposed therein, FIG. 2 shows the cross-section through the accelerator illustrated in FIG. 1 along the line II—II of FIG. 1, FIG. 3 shows a longitudinal section through the mouth region of the ram accelerator of FIGS. 1 and 2 with a preceding vacuum chamber which accommodates a release means, the longitudinal dimensions shown in FIG. 3 not being true to scale.

In FIGS. 1 and 2 part of an acceleration path of a ram accelerator is shown in longitudinal section, said accelerator being constituted by a pipe 7 which is filled with combustible gas 8 and in the wall of which two oppositely disposed longitudinal grooves 6 are formed which are each undercut on both sides.

Figure 4:
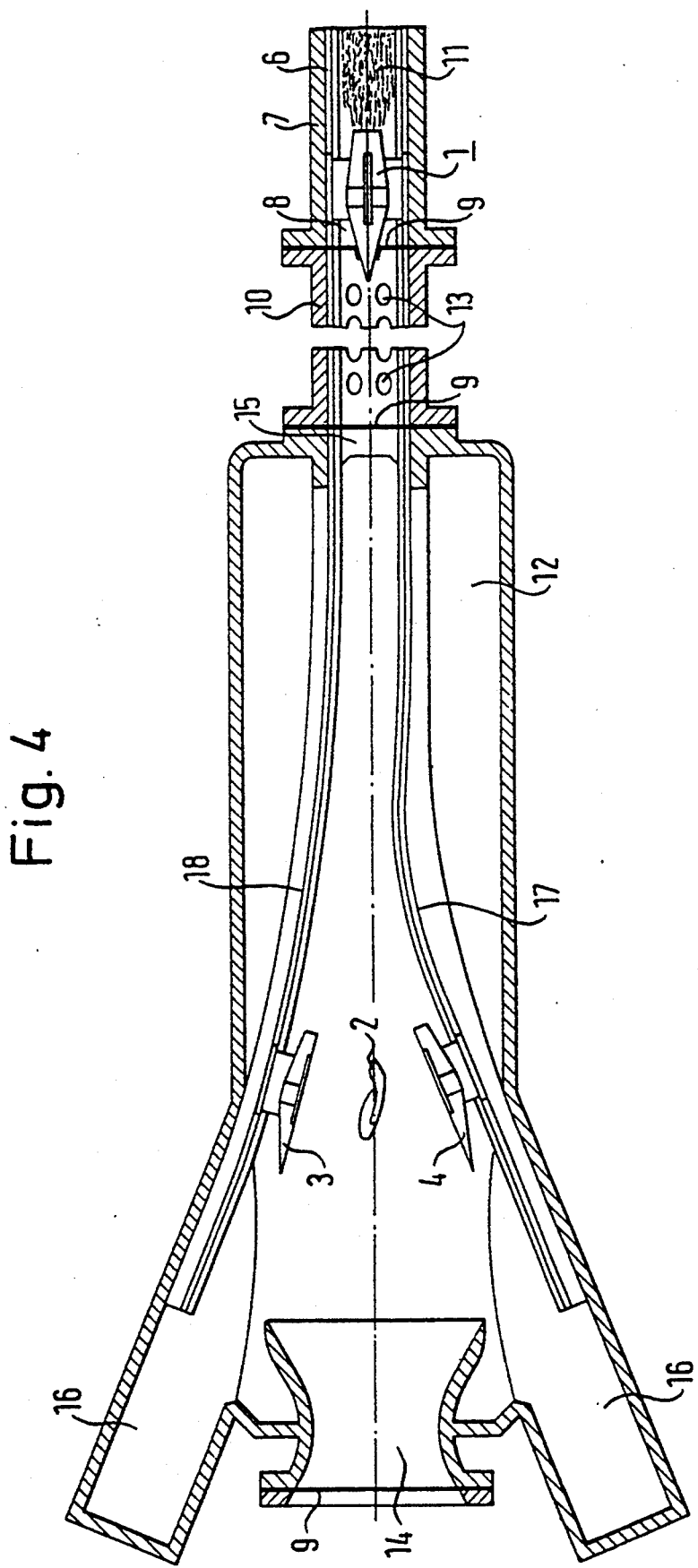
FIG. 4 is an illustration similar to that of FIG. 3, the longitudinal section through a modified vacuum chamber being shown, likewise with length dimensions which are not true to scale.
Figure 5:
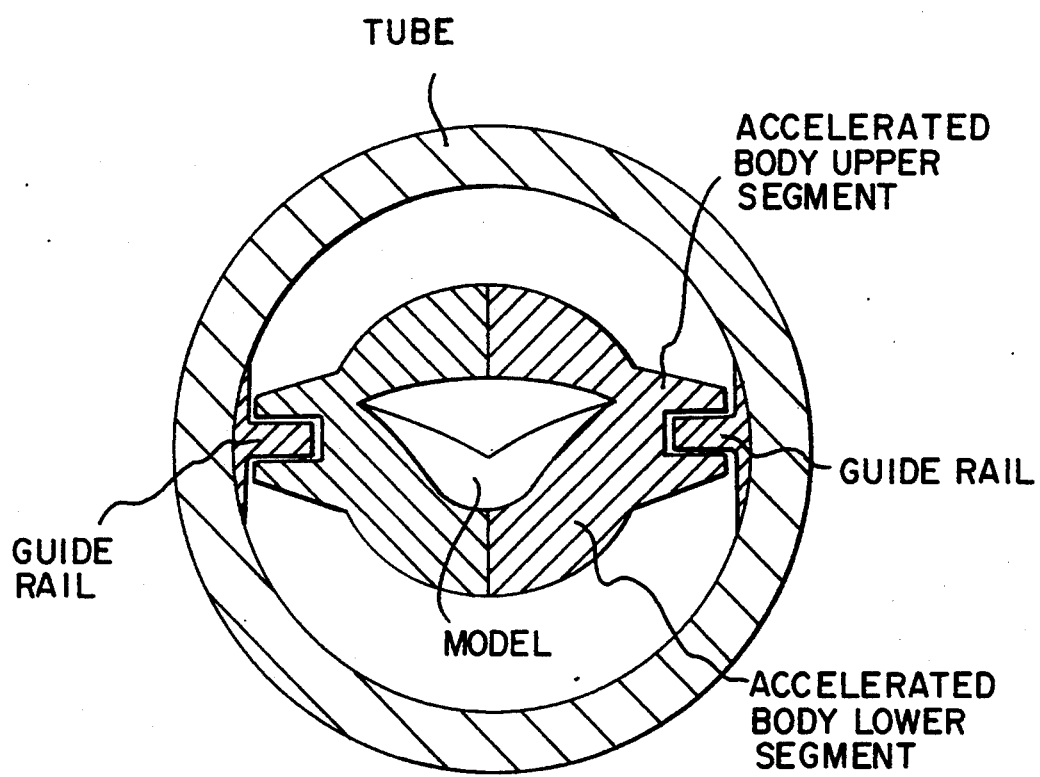
FIG. 5 schematically depicts a guide rail embodiment having two guide rails.

An acceleration body 1 is guided in the pipe 7 and is formed from two propelling housing parts 3 and 4 which enclose and support a missile 2.

The two propelling housing parts 3, 4 are so constructed that they form a propelling housing which as a whole comprises a conical nose, a cylindrical center section and a conically tapering tail. The cylindrical center section defines the cal. iber of the acceleration body 1 and is spaced from the inner wall of the pipe 7 a distance governed by the requirements of the compression.

The two propelling housing parts 3, 4 adjoin each other in the illustration shown substantially along a division plane which accommodates the bore axis of the pipe 7; the bore axis may however also be disposed outside the division or joint plane.

Both the propelling housing parts 3, 4 are widened flangelike in the division plane and form engaging narrow support webs which bear against the inner wall of the pipe 7 and serve on the one hand for the support.

In the middle between the support webs and perpendicularly thereto pulling webs extend which likewise serve to support the acceleration body 1 but which each have at their ends a respective slide shoe 5 which slides in the undercut cavity of the associated groove 6.

As apparent from FIG. 1, the axial length of the pulling and support webs is about half the total length of the acceleration body 1 which in turn is just under four calibers in length.

In FIG. 3 the mouth region of the acceleration shown in FIGS. 1 and 2 is illustrated.

The mouth of the pipe 7 is closed by a strong diaphragm 9 which does not offer any appreciable resistance to the movement of the acceleration body but withstands the inner pressure of the combustible gas 8 in the pipe 7.

The illustration of FIG. 3 shows the nose of the acceleration body 1 just penetrating the diaphragm 9.

A tube section 10 is flanged to the mouth of the pipe 7 coaxially therewith and the wall thereof is traversed by bores 13 practically over its entire length.

In the wall of the pipe section 10 two oppositely disposed longitudinal grooves are formed which represent a flush continuation of the longitudinal grooves 6 in the pipe 7 and have the same cross-section as the latter.

The pipe section 10 is shown greatly shortened; its purpose is to outwardly deflect the combustion gases 11 following the acceleration body 1 through the respective bores 13 disposed behind the acceleration body. The bores 13 each disposed in front of the acceleration body form the exit for the air displaced by said body unless said air flows round said body, thus minimizing flow losses.

The pipe section 10 is flanged to a vacuum chamber 12 coaxial therewith; the joint is sealed by a diaphragm 9 which is formed like the diaphragm 9 at the mouth of the pipe 7 and intended to prevent outer air penetrating through the bores 13 and the pipe section 10 into the vacuum chamber.

The outlet end 14 of the vacuum chamber is sealed by a similar diaphragm.

Within the vacuum chamber 12 the two longitudinal grooves 6 of the pipe 7 and of the pipe section 10 are continued flush and rectilinearly at the inlet thereof but then diverge gradually and terminate in the mouth region of the vacuum chamber at a distance from the bore axis, inclined at an acute angle thereto and in each case at the inlet of an interception well 16.

The vacuum chamber is of much greater longitudinal extent than is shown in FIG. 3.

Near the inlet to the vacuum chamber 12 cavities are shown which lie radially outside the longitudinal grooves 6 and which serve to enlarge the interior of the vacuum chambers and to suck off air-fuel gas mixture flowing after the acceleration body to avoid said mixture impairing the operation of the detachment of the propelling housing parts 3 and 4 from the model 2. Such cavities are however necessary only if the velocity of the acceleration body 1 is not greater than the velocity of the air on entering the vacuum, which in turn is about 770 m/s.

However, because of the simpler constructional form it is also advantageous in a faster acceleration body to make the vacuum chamber 12 as a cylindrical vessel as shown.

As apparent, the slide shoes 5 of an acceleration body 1 fired into the vacuum chamber move along the grooves 6 gradually outwardly and via the pulling webs pull the respective propelling housing part 3 or 4 outwardly away from the model 2 so that said part is detached from the point substantially left of the center of FIG. 3 onwards and moves in free flight to the outlet 14. During this movement the missile or model 2 is not influenced by any attack flow because it is moving in a vacuum.

The detached propelling house parts 3 and 4, guided by their slide shoes 5, move further along the increasingly diverging guide grooves 6 until they become free at the end thereof and with a movement direction inclined to the bore axis enter interception wells 16 and strike the bottom thereof.

These interception wells form elongated boxes which have splinter-proof walls and are inclined to the bore axis and represent continuations of the ends of the longitudinal grooves 6 and the interior of which communicates with the vacuum chamber 12.

The respective bottom of the interception wells 16 is made so stable that it withstands the immediate impact of the propelling housing parts 3 or 4 and also lies in front of the diaphragm sealing the outlet 14, it is thus ensured that any rebounding splinters of the propelling housing parts 3 and 4 cannot impair the flight of the model 2 or interfere with the measurements made thereon because if at all they can follow the model 2 only at a pronounced distance.

The outlet 14 itself is constructed as nozzle-like pipe section which traverses the front wall of the vacuum chamber 12; this attachment obstructs the exit of splinters from the vacuum chamber 12.

Before each firing the diaphragms 9 at the inlet and outlet of the vacuum chamber 12 and pipe 7 should be renewed and the vacuum chamber 12 and pipe 7 evacuated; the pipe 7 should be filled with the particular combustible gas selected up to a particular pressure selected.

The acceleration body 1 is then fired along the bore axis, for instance by means of an electromagnetic preaccelerator or a compressed gas gun, into the diaphragm of the pipe 7 facing opposite the acceleration direction and thus into the pipe and with its conical front portion compresses the combustible gas 8 which flows round the acceleration body 1, deflected by the guide and pulling webs, and burns at the side and tail thereof, a pressure cushion of combustion gases 11 gently pushing the acceleration body 1 being formed and accelerated with said body.

In front of the outlet 14 of the vacuum chamber a measuring path disposed in the free atmosphere or in a measuring tunnel is formed.

In FIG. 4 a vacuum chamber is shown which coincides largely with that of FIG. 3. The description of FIG. 3 is thus completely applicable to FIG. 4; for this reason, the features described in conjunction with FIG. 3 will not be described again.

In contrast to the vacuum chamber 12 shown in FIG. 3 the vacuum chamber 12 of FIG. 4 has a release means which is designed for bringing the missile 2 into a desired flight attitude on detachment of the propelling housing parts 3, 4.

Directly before the point at which the two grooves 6 diverge, the groove at the top in the drawing has already started at the point 18 to move away from the bore axis; the lower groove in the drawing however approaches the bore axis at the point 17 so that the mutual spacing of the grooves 6 remains the same. The groove 18 moves away from the bore axis, describing a gradual flatly curved curve. The groove 17 however covers a flatly curved section with an inversion point and then diverges from the other groove.

The acceleration body therefore deviates briefly somewhat from its flight path, whereafter the propelling housing parts 3, 4 are pulled off the missile. The latter is pivoted by the brief lateral deviation into its flight attitude in which it is then held stably by aerodynamic forces after leaving the vacuum chamber 12.

The following magnitudes are preferred:
Length of the pipe 7: 10 to 200 m
Caliber of the pipe 7: 30 to 500 mm=D
Gas filling of the pipe 7: $H_2$, $N_2$, $O_2$, He, $CH_4$
Length of the acceleration body 1: 3 D to 6 D
Caliber of the acceleration body 1: 0.7 D to 0.85 D
Dimensions of the missile 2: the span is less than D (on passing the pipe); the length is less than 3 D;
Weight of the missile 2: 0.5 to 5 kg
Length of the pipe section 10: 3 to 20 m
Length of the vacuum chamber 12: 20 to 50 m
Volume of the vacuum chamber 12: less than 0.2 to 50 $m^3$
Length of the diverging section of the grooves 6: 20 to 50 m
Angle between the ends of the diverging section of the grooves 6 and the bore axis: 1° to 5°
Distance between the ends of the diverging section of the grooves 6 and the bore axis: greater than D
Length of the interception wells 16: 2 to 20 m

I claim:
1. An acceleration apparatus comprising:
a ram accelerator pipe filled with combustible gas;
an acceleration body which is configured for guided and accelerated motion along said ram accelerator pipe, said acceleration body including a missile and a propelling housing at least partially surrounding said missile and in engagement therewith;
said ram accelerator pipe having at least two generally straight guide grooves formed in an interior of said ram accelerator pipe and which extend longitudinally along said ram accelerator pipe and are angularly spaced about a longitudinal axis of said ram accelerator pipe;
said propelling housing being composed of a plurality of housing parts, each of said plurality of housing parts respectively having an engagement means, and each said engagement means comprising a projection respectively slidably engaged in a respective one of said guide grooves for slidably connecting each of said plurality of housing parts with a respective one of said guide grooves; and
release means disposed at a muzzle-side end of said ram accelerator pipe, for detaching said propelling housing from said missile, said release means forcing movement of each of said plurality of housing parts along a predetermined path which extends transversely of a trajectory of said missile, such that the trajectory of said missile is not affected by detachment of said plurality of housing parts;
wherein said guide grooves are formed as undercut grooves.

2. Acceleration apparatus as claimed in claim 1, wherein said engagement means comprise enlarged tip portions which engage with respective ones of said undercut grooves so as to prevent withdrawal of said enlarged tip portions from the respective ones of said grooves.

* * * * *